(12) United States Patent
Eusemann

(10) Patent No.: US 10,169,869 B2
(45) Date of Patent: Jan. 1, 2019

(54) IMAGING SEQUENCE CONTROL USING AUTOMATED DETERMINATION OF FINDINGS

(71) Applicant: Siemens Healthcare GmbH, Erlangen (DE)

(72) Inventor: Christian D. Eusemann, Malvern, PA (US)

(73) Assignee: Siemens Healthcare GmbH, Erlangen (DE)

( * ) Notice: Subject to any disclaimer, the term of this patent is extended or adjusted under 35 U.S.C. 154(b) by 173 days.

(21) Appl. No.: 15/372,828

(22) Filed: Dec. 8, 2016

(65) Prior Publication Data

US 2018/0165805 A1    Jun. 14, 2018

(51) Int. Cl.
*G06T 7/00* (2017.01)
*G06K 9/46* (2006.01)
*G06T 11/00* (2006.01)

(52) U.S. Cl.
CPC .......... *G06T 7/0012* (2013.01); *G06K 9/4671* (2013.01); *G06T 11/003* (2013.01); *G06T 2207/10072* (2013.01)

(58) Field of Classification Search
CPC ..... G06T 7/0012; G06T 7/0014; G06F 19/30; G06F 19/34; G16H 30/00; G16H 40/60; G16H 40/63; G16H 50/00; G16H 50/29; A61B 5/0033
See application file for complete search history.

(56) References Cited

U.S. PATENT DOCUMENTS

| | | | |
|---|---|---|---|
| 2006/0100507 A1* | 5/2006 | Mertelmeier | A61B 6/502 600/425 |
| 2014/0185900 A1* | 7/2014 | Lee et al. | G06T 7/0014 382/131 |
| 2016/0364862 A1* | 12/2016 | Reicher et al. | G06T 7/0014 |

* cited by examiner

*Primary Examiner* — Andrew W Johns

(57) ABSTRACT

A system includes acquisition of an image of a patient volume, automatic determination of medical findings based on the image of the patient volume, automatic determination to assign the medical findings to a priority review queue, the priority review queue including medical findings to be reviewed while the patient remains proximate to the medical imaging scanner, reception of an authorization to acquire a second image of the patient volume based on the medical findings while the patient remains proximate to the medical imaging scanner, and acquisition of the second image of the patient volume while the patient remains proximate to the medical imaging scanner.

14 Claims, 7 Drawing Sheets

← 300

| Organ | Disease | Reconstruction Type | Kernel |
|---|---|---|---|
|  |  |  |  |
|  |  |  |  |
|  |  |  |  |
|  |  |  |  |
|  |  |  |  |
|  |  |  |  |

*FIG. 3*

IMAGING SEQUENCE CONTROL USING AUTOMATED DETERMINATION OF FINDINGS

BACKGROUND

Medical imaging is commonly used for disease prevention and diagnosis. In a typical scenario, a patient is positioned on/in a medical imaging device and an image of an internal patient volume is obtained. The patient is then discharged from the imaging center.

Eventually, the image is read by appropriate medical personnel to identify disease, track disease progression, or for any other purpose. The medical personnel may also determine whether to recommend any follow-up procedures. For example, it may be recommended to obtain a new image of the patient volume. Obtaining a new image requires scheduling a new patient visit to the imaging center, travelling to and from the imaging center, and setting up the patient and the medical imaging device to obtain the new image. These additional steps introduce many associated costs.

Some of these costs may be reduced by asking the patient to remain at the imaging center until medical personnel determines whether a follow-up imaging procedure is required. However, due to the typically-limited availability of qualified personnel, many hours may elapse between this determination and the original acquisition of the image. Moreover, due to the cost of medical imaging devices, any processes which increase imaging device down-time are discouraged. Accordingly, systems are desired to improve the efficiency of medical imaging.

BRIEF DESCRIPTION OF THE DRAWINGS

The construction and usage of embodiments will become readily apparent from consideration of the following specification as illustrated in the accompanying drawings, in which like reference numerals designate like parts, and wherein:

FIG. 3 is a tabular representation of data to determine an image reconstruction technique according to some embodiments;

DETAILED DESCRIPTION

The following description is provided to enable any person in the art to make and use the described embodiments and sets forth the best mode contemplated for carrying out the described embodiments. Various modifications, however, will remain readily apparent to those in the art.

Briefly, some embodiments increase system productivity by efficiently distinguishing between patients for whom follow-up imaging is desirable and those for whom it is not.

Figure 1:
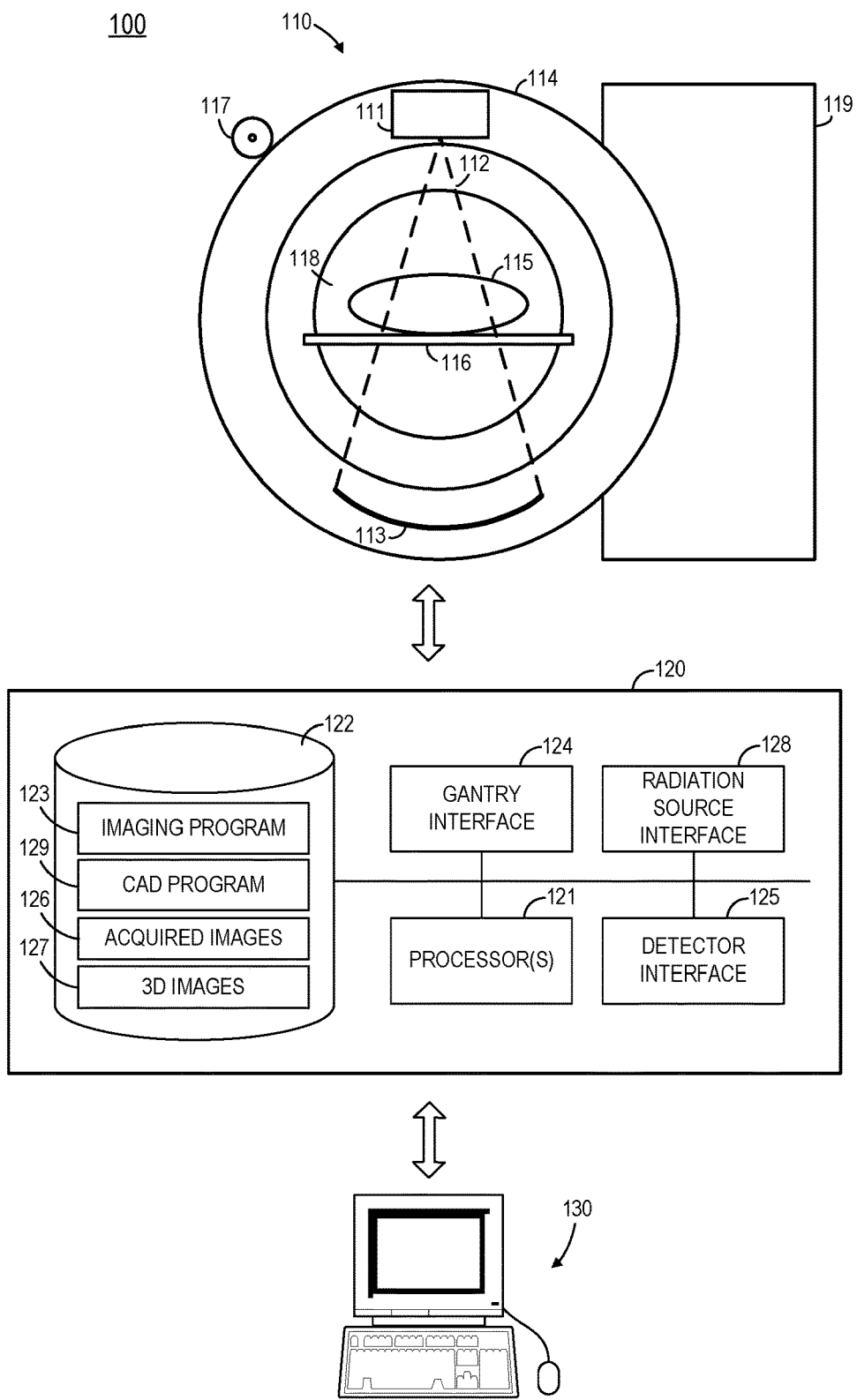
FIG. 1 illustrates an imaging system according to some embodiments.

FIG. 1 illustrates system 100 according to some embodiments. System 100 includes X-ray imaging system 110, control and processing system 120, and operator terminal 130. Generally, and according to some embodiments, X-ray imaging system 110 acquires two-dimensional X-ray images of a patient volume. Control and processing system 120 controls X-ray imaging system 110 and receives the acquired images therefrom. Control and processing system 120 processes the images as described below and provides the processed images and/or information determined based on the processed images to terminal 130 for display thereby. Such processing may be based on user input received by terminal 130 and provided to control and processing system 120 by terminal 130.

Imaging system 110 comprises a CT scanner including X-ray source 111 for emitting X-ray beam 112 toward opposing radiation detector 113. Embodiments are not limited to CT scanners, and may utilize any system for acquiring an image based on which medical findings may be produced. X-ray source 111 and radiation detector 113 are mounted on gantry 114 such that they may be rotated about a center of rotation of gantry 114 while maintaining the same physical relationship therebetween.

In operation, patient 115 is positioned on bed 116 to place a portion of patient 115 between X-ray source 111 and radiation detector 113. Next, X-ray source 111 and radiation detector 113 are moved to various projection angles with respect to patient 115 by using rotation drive 117 to rotate gantry 114 around cavity 118 in which patient 115 is positioned. At each projection angle, X-ray source 111 is powered by high-voltage generator 119 to transmit X-ray radiation 112 toward detector 113. Detector 113 receives the radiation and produces a set of data (i.e., a raw image) for each projection angle.

X-ray source 111 may comprise any suitable radiation source, including but not limited to a Gigalix™ x-ray tube. In some embodiments, radiation source 112 emits electron, photon or other type of radiation having energies ranging from 50 to 150 keV.

Radiation detector 113 may comprise any system to acquire an image based on received X-ray radiation. In some embodiments, radiation detector 113 uses a scintillator layer and solid-state amorphous silicon photodiodes deployed in a two-dimensional array. The scintillator layer receives photons and generates light in proportion to the intensity of the received photons. The array of photodiodes receives the light and records the intensity of received light as stored electrical charge.

In other embodiments, radiation detector 113 converts received photons to electrical charge without requiring a scintillator layer. The photons are absorbed directly by an array of amorphous selenium photoconductors. The photoconductors convert the photons directly to stored electrical charge.

The charge detected by detector 113 represents radiation intensities at each location of radiation fields produced by X-rays emitted from radiation source 111. The radiation intensity at a particular location of each radiation field represents the attenuative properties of materials lying along a divergent line between detector 113 and the particular location of the radiation field. The set of radiation intensities acquired by radiation detector 113 therefore represents a two-dimensional projection image of these materials.

System 120 may comprise any general-purpose or dedicated computing system. Accordingly, system 120 includes one or more processors 121 configured to execute processor-executable program code to cause system 120 to operate as described herein, and storage device 122 for storing the program code. Storage device 122 may comprise one or more fixed disks, solid-state random access memory, and/or removable media (e.g., a thumb drive) mounted in a corresponding interface (e.g., a USB port).

Storage device 122 stores program code of imaging program 123. One or more processors 121 may execute imaging program 123 to determine imaging parameters, to rotate gantry 114, to cause radiation source 111 emit radiation at desired energies, and to control detector 113 to acquire images. In this regard, system 120 includes gantry interface 124, detector interface 125 and radiation source interface 128 for communication with elements of system 110. System 120 may also receive input from terminal 130 which may be used to control image acquisition.

Images acquired from system 110 are stored in data storage device 122 as acquired images 126, in DICOM or another data format. Each acquired image 126 may be further associated with details of its acquisition, including but not limited to imaging plane position and angle, imaging position, radiation source-to-detector distance, patient anatomy imaged, patient position, contrast medium bolus injection profile, x-ray tube voltage, image resolution and radiation dosage.

Processor(s) 121 may execute imaging program 123 to process acquired images 126. Such processing may generate three-dimensional images 127, which are reconstructed from corresponding sets of two-dimensional images as is known in the art. As will be described below, some embodiments utilize two or more three-dimensional reconstruction techniques to generate two or more three-dimensional images based on a same set of two-dimensional images. Acquired images 126 and/or three-dimensional images 127 may be provided to terminal 130 for display.

Processor(s) 121 may further execute computer-aided diagnosis (i.e., CAD) program 129 to perform computer-aided diagnosis based on acquired images 126 and/or three-dimensional images. Such processing according to some embodiments will be described in detail below. Briefly, computer-aided diagnosis according to some embodiments may identify features within the imaged patient volume. These features may be used to generate findings which, in turn, are used to determine next steps associated with the patient.

Terminal 130 may comprise a display device and an input device coupled to system 120. In some embodiments, terminal 130 is a separate computing device such as, but not limited to, a desktop computer, a laptop computer, a tablet computer, and a smartphone. Terminal 130 displays images and feature profiles received from system 120, receives user input for controlling systems 110 and 120, and transmits such user input to system 120.

Each of system 110, system 120 and terminal 130 may include other elements which are necessary for the operation thereof, as well as additional elements for providing functions other than those described herein.

According to the illustrated embodiment, system 120 controls the elements of system 110. System 120 also processes images received from system 110. Moreover, system 120 receives input from terminal 130 and provides processed images to terminal 130. Embodiments are not limited to a single system performing each of these functions. For example, system 110 may be controlled by a dedicated control system, with the acquired images being provided to a separate image processing system over a computer network or via a physical storage medium (e.g., a DVD).

Embodiments are not limited to a CT scanner as described above with respect to FIG. 1. For example, embodiments may employ a dual-arm CT scanner using two radiation sources and corresponding detectors. Such systems may acquire two-dimensional images from two different projection angles substantially simultaneously. Systems employing other imaging modalities (e.g., magnetic resonance imaging, positron-emission tomography, single-photon emission computed tomography, X-ray, etc.) may be used in some embodiments.

Figure 2:
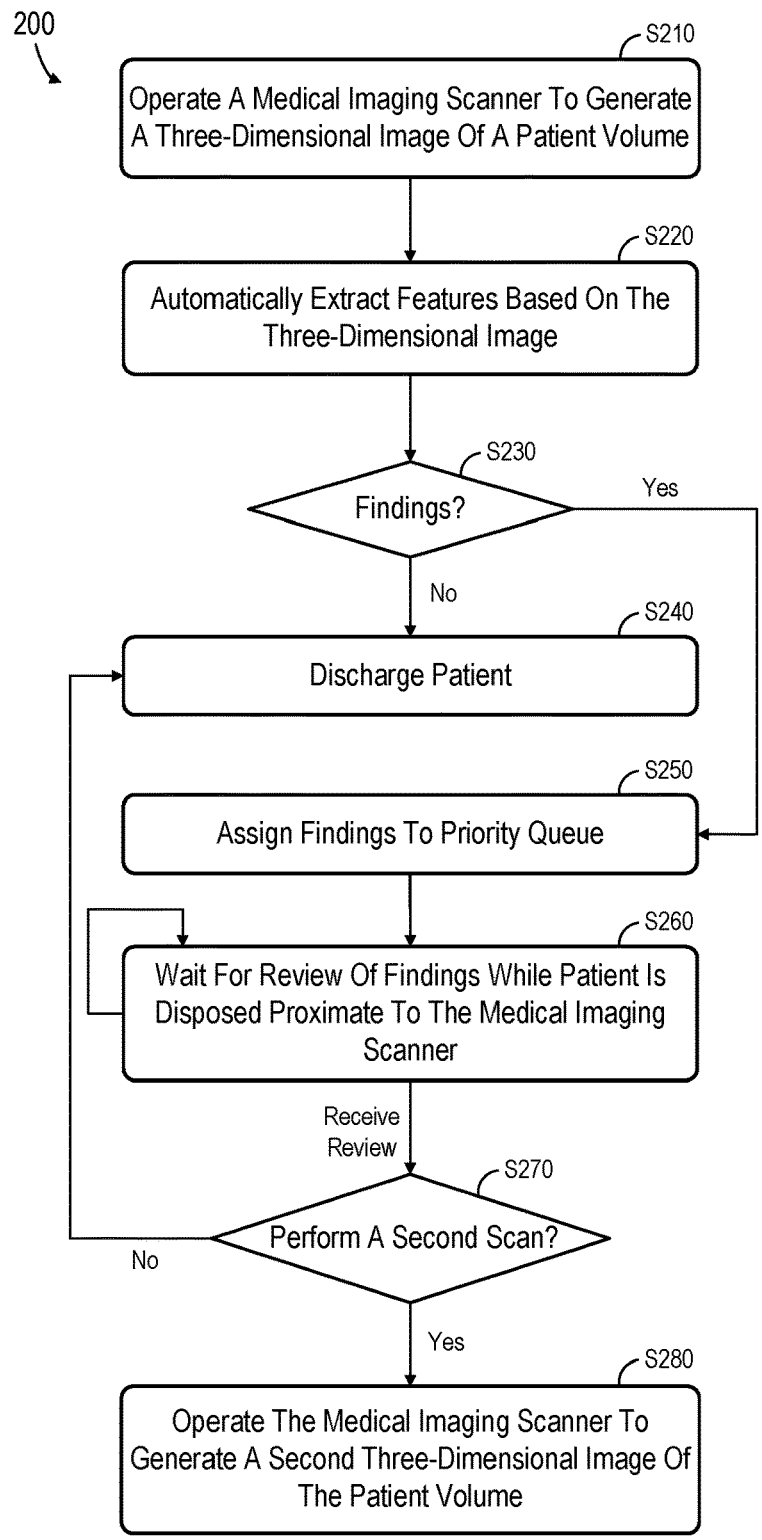
FIG. 2 comprises a flow diagram of a process according to some embodiments.

FIG. 2 comprises a flow diagram of process 200 according to some embodiments. Process 200 and the other processes described herein may be performed using any suitable combination of hardware, software or other means. Software embodying these processes may be stored by any non-transitory tangible medium, including a fixed disk, a floppy disk, a CD, a DVD, a Flash drive, or a magnetic tape. Examples of these processes will be described below with respect to the elements of system 100, but embodiments are not limited thereto.

Initially, at S210, a medical imaging scanner is operated to generate a three-dimensional image of a patient volume. For example, prior to S210, the patient is positioned for imaging with respect to a medical imaging scanner according to known techniques. With reference to the elements of system 100, patient 115 is positioned on table 116 to place a particular volume of patient 115 between radiation source 111 and radiation detector 113. Table 116 may be adjusted to assist in positioning the patient volume as desired. As is known in the art, such positioning may be based on a location of a volume of interest, on positioning markers located on patient 115, on a previously-acquired planning image, and/or on a portal image acquired after an initial positioning of patient 115 on table 116.

According to some embodiments, system 120 executes imaging program 123 to instruct system 110 to rotate gantry 114 to position radiation source 111 and radiation detector 113 at each of a plurality of projection angles. At each projection angle, radiation source 111 is powered by generator 119 to emit X-ray radiation toward radiation detector 113. The parameters of the X-ray radiation emission (e.g., projection angles, timing, x-ray tube voltage, dosage) may be specified by a predetermined scan protocol, which may be selected depending upon the volume being scanned. Imaging program 123 uses these parameters to instruct system 120 to control imaging system 110. Radiation detector 113 receives the emitted radiation and produces a set of data (i.e., a projection image) for each projection angle at S210. The projection images may be received by system 120 and stored among acquired images 126.

A three-dimensional image is generated at S210 based on the plurality of two-dimensional images. The three-dimensional image may be generated using any three-dimensional reconstruction techniques that are or become known. According to some embodiments, the image reconstruction technique used at S210 may comprise a reconstruction technique which produces a three-dimensional image which is particularly suitable as input to a computer-aided diagnosis system.

Selection of an image reconstruction technique to use at S210 may be based on the volume to be imaged, the features to be extracted, the imaging modality and any other suitable variables. FIG. 3 is a tabular representation of a portion of a data structure 300 which may be used to determine suitable reconstruction techniques for use in S210 according to some embodiments. Each row of data structure 300 may specify a reconstruction technique (i.e., a reconstruction type and a kernel to be used in conjunction with the reconstruction type) based on an organ to be imaged and a disease type.

More than one reconstruction technique may correspond to a same combination of organ/disease. In other words, some rows of structure 300 may specify identical combinations of organ/disease but different reconstruction types and/or kernels. In such a situation, one of the reconstruction types/kernels may be selected for use at S210 or, alternatively, a separate three-dimensional image may be generated for each reconstruction technique at S210.

According to some embodiments, the imaging parameters used to acquire the plurality of two-dimensional images at S210 may also depend upon the organ/disease of interest. For example, data structure 300 may associate each organ/disease pair with one or more sets of imaging parameters (i.e., with each set of imaging parameters corresponding to a respective row of structure 300), and each set of imaging parameters may in turn be associated with one or more reconstruction techniques. Two or more different sets of imaging parameters may be associated with a same reconstruction technique, and two or more different reconstruction techniques may be associated with a same set of imaging parameters.

Returning to process 200, features are automatically extracted based on the three-dimensional image at S220. Any system for automated feature extraction that is or becomes known may be used at S220. S220 may comprise executing CAD program 129 to extract features from the three-dimensional image.

According to some embodiments, several different types of automated feature extraction and automated findings generation may be applied to one or more three-dimensional images at S220. For example, different automated feature extraction techniques may be used on different three-dimensional images, depending upon the reconstruction techniques used to generate the different three-dimensional images. For example, if a three-dimensional image is generated at S210 using a soft kernel, then texture extraction may be performed on the three-dimensional image at S220. If another three-dimensional image was generated at S210 using a hard kernel, then boundary extraction may be performed on this three-dimensional image at S220. The type of automated feature extraction and automated finding generation to be performed on images generated using a particular reconstruction technique may be stored in a data structure such as structure 300 according to some embodiments.

At S230, findings are determined based on the extracted features. S230 may employ any system for automatically generating findings that is or becomes known. it is determined whether to assign the findings to a priority queue. According to some embodiments, the findings may include a recommendation to perform an additional imaging scan on the patient based on the features extracted from the one or more three-dimensional images. The findings may, in some embodiments, include a description of a serious condition or of a condition for which another imaging scan may be useful in determining a diagnosis and/or treatment approach. For example, the three-dimensional image generated at S210 may represent a non-contrast-enhanced lung scan, and the features extracted at S220 may include lung lesions or nodules. As a result, the findings determined at S230 may comprise an indication that a contrast-enhanced lung scan is desirable.

The patient is discharged at S240 if it no findings are determined at S230. If findings are determined at S230, the findings are assigned to a priority queue at S250.

Figure 4:
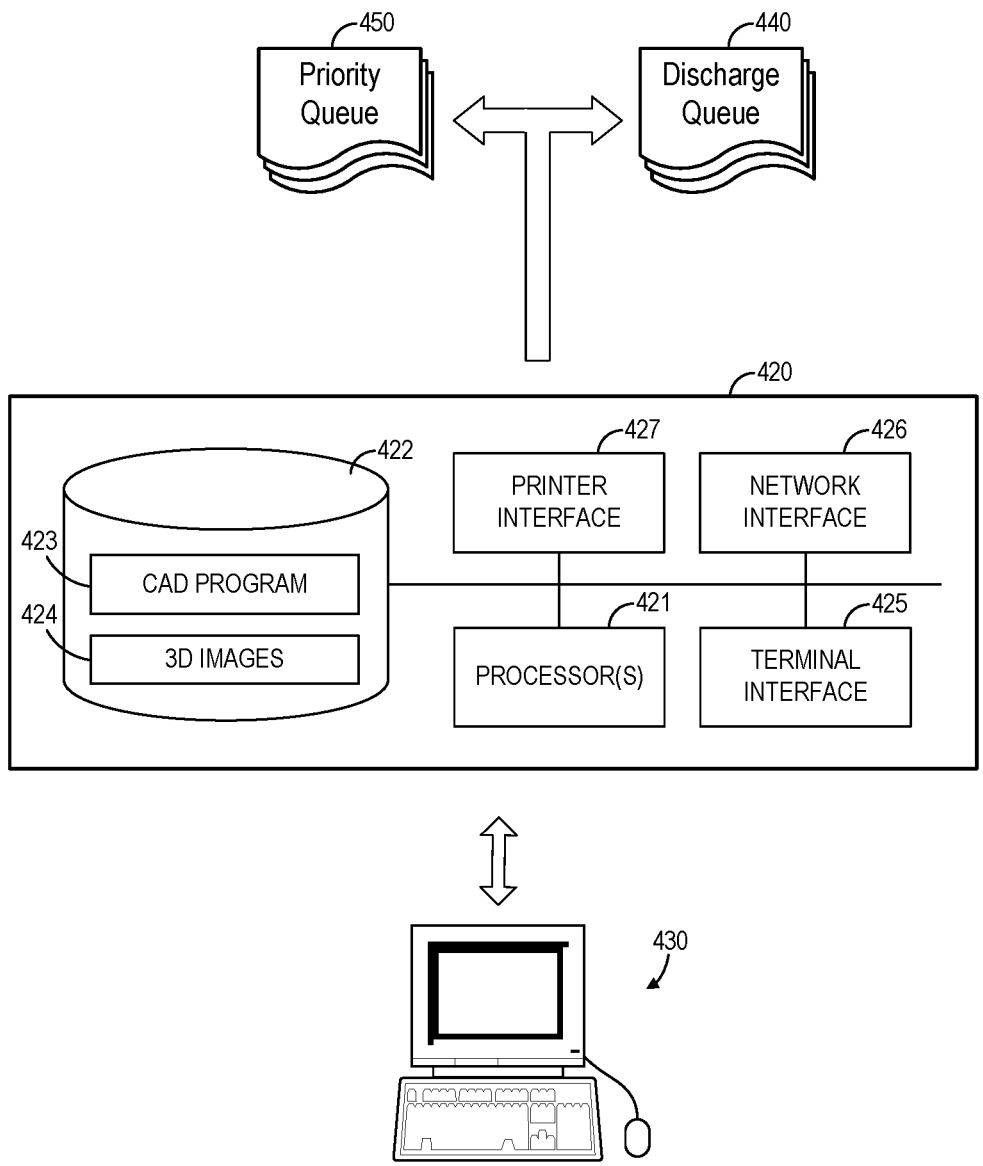
FIG. 4 illustrates a system for computer-aided diagnosis according to some embodiments.

FIG. 4 is a block diagram of a system to execute S220 through S250 according to some embodiments. Computing system 420 may receive the two-dimensional images acquired at S210 and generate a three-dimensional image therefrom or may receive a generated three-dimensional image. The images (two-dimensional or three-dimensional) may be received via network interface 426 or a storage medium. Computing system 420 may be located remote from system 100 of FIG. 1, either at a different location (i.e., floor, building, campus) of a same imaging center or at an altogether different center (e.g., in another country).

Computing system 420 includes CAD program 423 to automatically extract features and generate findings based on a three-dimensional image. According to some embodiments, findings generated by CAD program 423 are supplemental to findings generated by one or more other CAD programs, including but not limited to CAD program 129.

FIG. 4 also illustrates the assignment of findings to priority queue 450 and to discharge queue 440. With respect to process 200, a positive determination at S230 may result in assignment of the current findings to priority queue 450, while a negative determination results, at S240, of assignment of the current findings to discharge queue 440. Although queue 440 and queue 450 are illustrated as respective physical stacks of documents, it should be understood that the findings thereof may be stored in electronic form and assigned to a respective stack by association with an electronic flag, placement in a respective folder, and/or delivery to a respective network location. For example, the findings of discharge queue 440 may be delivered to a network location which is reviewed once per day, while the findings of priority queue 450 may be sent by e-mail to particular medical personnel who are currently assigned to review priority queue findings at minimum specified intervals.

After assigning findings to a priority queue, flow pauses at S260 to wait for a review of the findings. The patient may be located proximate to the medical imaging scanner during such waiting. In some examples, the patient remains on table 116 during S260. Such an arrangement may allow for more efficient acquisition of a subsequent scan, if needed. According to some embodiments, the patient remains at the imaging center during S260 but the medical imaging scanner may be used during this time to acquire images of one or more other patients. Selection of the former or the latter approach may depend upon the expected time needed to receive the review.

The findings to be reviewed may include a three-dimensional image of the patient which is suitable for human viewing. This three-dimensional image may be the three-dimensional image based on which the features were extracted at S220, or may comprise another three-dimensional image generated at S210. For example, a first three-dimensional image (or multiple three-dimensional images) suitable for feature extraction may be generated at S210 as described above, and a second three-dimensional image suitable for human viewing may also be generated at S210. The second three-dimensional image may be generated using a different reconstruction technique than that used to generate the first three-dimensional image.

The different reconstruction technique may be a technique which results in a three-dimensional image which is suitable for viewing by human eyes. For example, the reconstruction technique may be selected so as to generate a three-dimensional image which, when displayed to an operator, allows the operator to identify certain types of features more readily than if another reconstruction technique was used. According to some embodiments, the reconstruction technique is an iterative reconstruction technique using a sharp kernel. A filtered back-projection reconstruction technique may be used, also using a sharp kernel. This three-dimensional image may be displayed to an operator on terminal 430 and/or on another display of a separate computing system during S260.

Once the review is received, it is determined at S270 whether or not to perform a second scan. The review may comprise a report and/or instruction from medical personnel which indicates whether or not a second scan should be performed and, for example, one or more imaging parameters of the second scan (e.g., imaging modality, contrast/no-contrast, region of interest, reconstruction technique, etc.). According to some embodiments, the review comprises an indication of pathology and S270 comprises determination, based on the pathology and on predetermined information, of a whether a second scan should be performed and the parameters of such a second scan. The predetermined information may comprise a data structure associating pathologies with recommended scans and imaging parameters.

The patient is discharged at S240 as described above if it is determined to not perform a second scan. If it is determined to perform a second scan, the medical imaging scanner is operated at S280 to generate a second three-dimensional image of the patient volume. Operation at S280 may proceed as described above with respect to S210, albeit using different imaging parameters. In some embodiments, the imaging parameters of the second scan may be the same as the imaging parameters of the first scan (e.g., in case the first three-dimensional image includes blurring or another indication of imaging error).

Some embodiments therefore provide efficient determination of whether a second scan should be performed. As a result, the second scan may be performed more efficiently than prior systems requiring patient discharge prior to acquisition of a follow-up scan.

Figure 5:
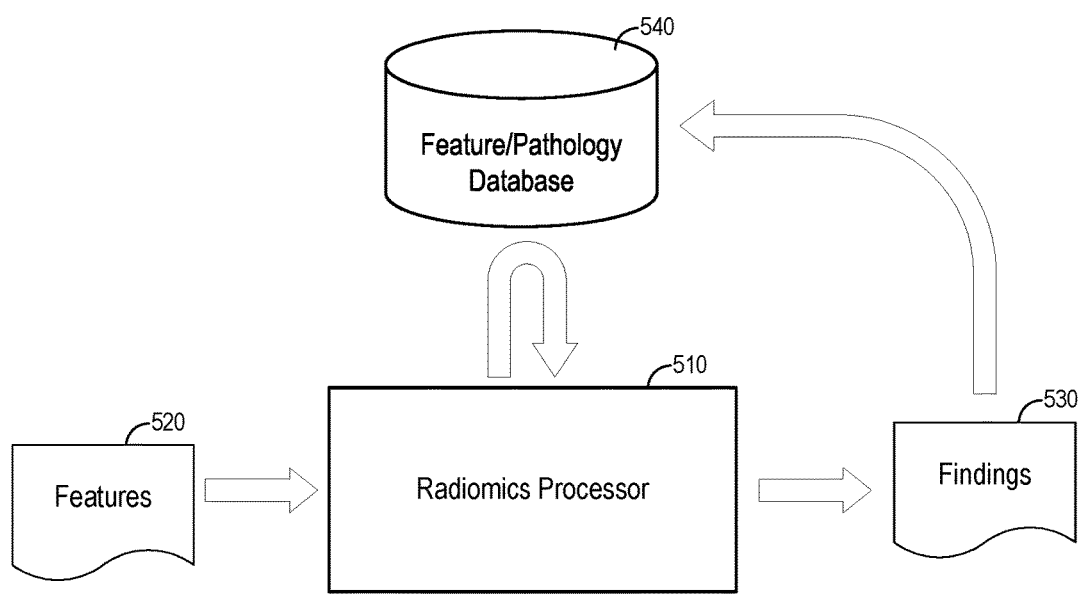
FIG. 5 illustrates determination of findings according to some embodiments.

FIG. 5 illustrates a system to determine findings at S230 according to some embodiments. Radiomics processor 510 may comprise an application executed on computer system 120, an application executed on a separate general-purpose computing device such as computer system 420, or a dedicated special-purpose computing device/network. As illustrated, radiomics processor 510 receives features 520 and generates findings 530 based on data stored in feature/pathology database 540. Moreover, findings 530 may feed back into feature/pathology database 540 to supplement learning algorithms thereof.

Radiomics processor 510 may generate findings 530 using one or more of convolutional neural networks, deep belief networks, recursive neural networks, recurrent neural networks, autoencoders, deep reinforcement learning, decision trees, random forests, Bayes networks, k-means clustering, support vector machines, etc. Accordingly, feature/pathology database 540 may evolve over time as called for by these techniques. Training data for feature/pathology database 540 may comprise medical images, electronic medical records, medical literature, laboratory reports, genomic data, insurance data, and/or data acquired by wearable movement-tracking electronics.

Figure 6:
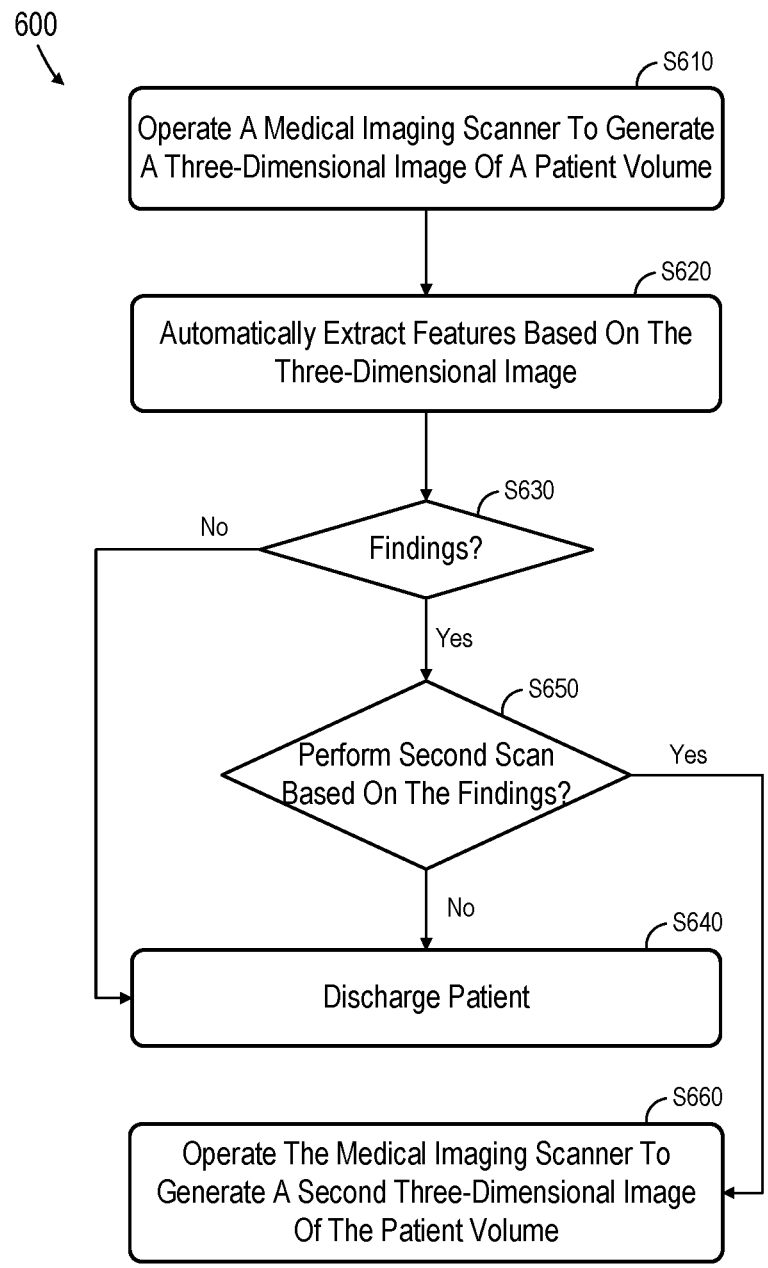
FIG. 6 comprises a flow diagram of a process according to some embodiments.

FIG. 6 comprises a flow diagram of process 600 according to some embodiments. Generally, and unlike process 200 of FIG. 2, process 600 provides automated execution of a second scan based on a first scan. Accordingly, process 600 may introduce further efficiencies in jurisdictions which permit automatic performance of certain types of follow-up scans without intermediate authorization from medical personnel.

S610, S620 and S630 may be performed as described above with respect to S210, S220 and S230. If it is determined at S630 that no relevant findings exist, flow proceeds to S640 to discharge the patient as described above with respect to S240. If findings are determined at S630, it is automatically determined whether to perform a second scan at S650. The determination at S650 may be based on the findings and on any other computer-aided diagnosis techniques that are or become known. According to some embodiments, the finding themselves indicate that a second scan should be performed, and S650 merely comprises identification of such an indication.

S650 may comprises automatic determination of a pathology and determination, based on the pathology and on predetermined information, of a whether a second scan should be performed and the parameters of such a second scan. As mentioned above, the predetermined information may comprise a data structure associating pathologies with recommended scans and imaging parameters.

Figure 7:
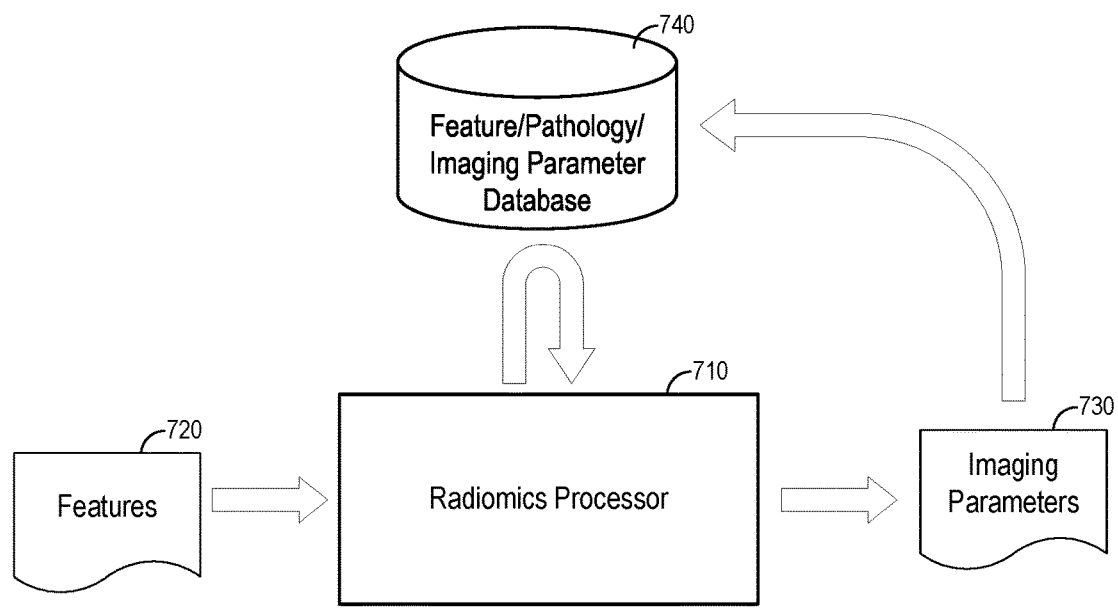
FIG. 7 illustrates determination of a diagnosis according to some embodiments.

FIG. 7 illustrates a system to execute S630 and S650 according to some embodiments. Radiomics processor 710 may be implemented as described above with respect to radiomics processor 510. Radiomics processor 710 receives information describing extracted features 720 and generates imaging parameters 730 of a second scan based on data stored in feature/pathology/imaging parameter database 740. Imaging parameters 730 may feed back into feature/pathology 740 database to supplement learning algorithms thereof.

If it is determined to perform a second scan at S650, the medical imaging scanner is operated at S660 to generate a second three-dimensional image of the patient volume. According to some embodiments, and due to the reduction of human intervention provided by process 600, the patient remains in an imaging room during the entirety of process 600. The imaging parameters of the second scan may be automatically determined as described above, or may be at least partially determined by an operator S660 based on the findings, diagnosis or instructions generated at S650. As mentioned with respect to process 200, the imaging parameters of the second scan may be different from or the same as the imaging parameters of the first scan (e.g., in case the first three-dimensional image includes blurring or another indication of imaging error).

Those in the art will appreciate that various adaptations and modifications of the above-described embodiments can be configured without departing from the scope and spirit of the claims. Therefore, it is to be understood that the claims may be practiced other than as specifically described herein.

What is claimed is:

1. A system comprising:
   a medical imaging scanner to acquire an image of a patient volume; and
   a processing device to:
   automatically determine medical findings based on the image of the patient volume; and
   automatically determine to assign the medical findings to a priority review queue, the priority review queue including medical findings to be reviewed while the patient remains proximate to the medical imaging scanner,
   wherein the system is to receive an authorization to acquire a second image of the patient volume based on the medical findings while the patient remains proximate to the medical imaging scanner, and
   wherein medical imaging scanner is to acquire the second image of the patient volume.

2. A system according to claim 1, wherein the processing device is further to:
perform automated feature extraction on the image to automatically extract information associated with features of the patient volume,
wherein the medical findings are automatically determined based on the information associated with features of the patient volume.

3. A system according to claim 2, wherein the image comprises a three-dimensional image reconstructed using a reconstruction technique optimized for automated feature extraction.

4. A system according to claim 1, wherein the medical imaging scanner is to acquire a second image of a second patient volume, and
wherein the processing device is to:
automatically determine second medical findings based on the second image of the second patient volume; and
automatically determine to assign the second medical findings to the priority review queue,
wherein the system is to receive an instruction to not acquire another image of the patient volume based on the second medical findings while the patient remains proximate to the medical imaging scanner.

5. A system according to claim 4, wherein the medical imaging scanner is to acquire a third image of a third patient volume, and
wherein the processing device is to:
automatically determine third medical findings based on the third image of the third patient volume; and
automatically determine to assign the third medical findings to a discharge queue, the discharge queue including medical findings to be reviewed after the patient is discharged.

6. A system according to claim 1, wherein the medical imaging scanner is to acquire a second image of a second patient volume, and
wherein the processing device is to:
automatically determine second medical findings based on the second image of the second patient volume; and
automatically determine to assign the second medical findings to a discharge queue, the discharge queue including medical findings to be reviewed after the patient is discharged.

7. A system according to claim 1, wherein the medical imaging scanner acquires the first image based on a first set of imaging parameters and acquires the second image based on a second set of imaging parameters,
wherein the first set of imaging parameters is different from the second set of imaging parameters.

8. A method comprising:
acquiring an image of a patient volume;
automatically determining medical findings based on the image of the patient volume;
automatically determining to assign the medical findings to a priority review queue, the priority review queue including medical findings to be reviewed while the patient remains proximate to the medical imaging scanner;
receiving an authorization to acquire a second image of the patient volume based on the medical findings while the patient remains proximate to the medical imaging scanner; and
acquiring the second image of the patient volume while the patient remains proximate to the medical imaging scanner.

9. A method according to claim 8, further comprising:
performing automated feature extraction on the image to automatically extract information associated with features of the patient volume,
wherein the medical findings are automatically determined based on the information associated with features of the patient volume.

10. A method according to claim 9, wherein the image comprises a three-dimensional image reconstructed using a reconstruction technique optimized for automated feature extraction.

11. A method according to claim 8, further comprising:
acquiring a second image of a second patient volume;
automatically determining second medical findings based on the second image of the second patient volume;
automatically determining to assign the second medical findings to the priority review queue; and
receiving an instruction to not acquire another image of the patient volume based on the second medical findings while the patient remains proximate to the medical imaging scanner.

12. A method according to claim 11, further comprising:
acquiring a third image of a third patient volume;
automatically determining third medical findings based on the third image of the third patient volume; and
automatically determining to assign the third medical findings to a discharge queue, the discharge queue including medical findings to be reviewed after the patient is discharged.

13. A method according to claim 8, further comprising:
acquiring a second image of a second patient volume;
automatically determining second medical findings based on the second image of the second patient volume; and
automatically determining to assign the second medical findings to a discharge queue, the discharge queue including medical findings to be reviewed after the patient is discharged.

14. A method according to claim 8, further comprising acquiring the first image based on a first set of imaging parameters and acquiring the second image based on a second set of imaging parameters,
wherein the first set of imaging parameters is different from the second set of imaging parameters.

* * * * *